US007188991B1

(12) United States Patent
Weiler (10) Patent No.: US 7,188,991 B1
(45) Date of Patent: Mar. 13, 2007

(54) AUXILIARY CONTROL STATION FOR A REAR DISPENSING CONCRETE MIXING VEHICLE

(75) Inventor: Patrick J. Weiler, Pella, IA (US)

(73) Assignee: Five Star Industries, Inc., Knoxville, IA (US)

( * ) Notice: Subject to any disclaimer, the term of this patent is extended or adjusted under 35 U.S.C. 154(b) by 424 days.

(21) Appl. No.: 10/818,553

(22) Filed: Apr. 5, 2004

(51) Int. Cl.
B28C 5/42 (2006.01)

(52) U.S. Cl. .................... 366/60; 180/324; 180/335; 180/336

(58) Field of Classification Search ............ 366/53–60; 296/63–64; 180/318, 321, 323–324, 331, 180/333–334, 326, 335–336
See application file for complete search history.

(56) References Cited

U.S. PATENT DOCUMENTS

| 3,173,258 | A | * | 3/1965 | Hare et al. .................. 180/324 |
| 4,212,542 | A | | 7/1980 | Beekenkamp |
| 4,311,396 | A | | 1/1982 | Brandi |
| 4,846,581 | A | * | 7/1989 | Osterlund et al. ............ 366/61 |
| 5,190,118 | A | | 3/1993 | Yelton |
| 5,251,722 | A | * | 10/1993 | Scratchard .................. 180/321 |
| 5,348,387 | A | | 9/1994 | Gordon et al. |
| 5,492,402 | A | | 2/1996 | Alton |
| 5,884,998 | A | | 3/1999 | Silbernagel |
| 5,954,429 | A | | 9/1999 | Silbernagel |
| 6,062,716 | A | | 5/2000 | Georgoulis |
| 6,149,290 | A | | 11/2000 | Quigley |
| 6,350,051 | B1 | | 2/2002 | Cain |
| 6,675,508 | B2 | * | 1/2004 | Tamaru et al. ............... 180/333 |
| 6,971,194 | B2 | * | 12/2005 | McClelland et al. ........ 180/334 |

FOREIGN PATENT DOCUMENTS

WO 92/15437 * 9/1992

* cited by examiner

Primary Examiner—Charles E. Cooley
(74) Attorney, Agent, or Firm—G. Brian Pingel; Camille L. Urban (57) ABSTRACT

An auxiliary control station for a rear dispensing concrete truck that controls the truck's steering, braking, and throttle. A seat with controls accessible from the seat may be positioned outside of the cab, such as to allow control of the truck from a position with an unobstructed view of the rear of the truck. The concrete dispensing chute may be modified so as to allow mechanical control of the left and right swing of the chute. The auxiliary control station also controls the drum and positioning of the chute.

19 Claims, 9 Drawing Sheets

AUXILIARY CONTROL STATION FOR A REAR DISPENSING CONCRETE MIXING VEHICLE

BACKGROUND OF THE INVENTION

1. Field of the Invention

The present invention relates in general to mobile concrete mixer trucks and, specifically to a providing auxiliary control of the truck and drum for concrete delivery.

2. Description of the Prior Art

There are generally two types of mobile concrete mixer trucks known in the art. The primary design is called a rear discharge system that places a cylindrical barrel on a truck chassis with an opening in the rearward facing end of the barrel. This opening is the barrel load and unload port. Typically, the operator drives to the construction site, and then gets out of the truck's cab and operates the unloading chutes while on the ground. As needed, he gets back into the truck cab to reposition the truck. Many times a second person is charged with positioning the unloading chutes for delivering the concrete as needed.

A secondary design provides a front discharge system that places a cylindrical barrel on a truck chassis. The discharge opening faces the front of the truck and is placed over the truck cab. The driver is provided the ability to hydraulically move the chute for delivery placement without leaving the truck cab and can, of course, reposition the truck as desired. This configuration usually requires a purpose-built truck chassis and, contrary to the more predominant rear discharge systems, the truck cannot be readily retrofitted for other uses. The characteristics of a front discharge arrangement result in much higher costs mainly because mass production cost efficiencies are not available and the resale values are lower.

Several attempts have been made to improve the dispensing of concrete by means of a separate and remote control station. U.S. Pat. No. 5,190,118 solved the problem of remotely controlling a rear dispensing concrete truck and the dispensing of concrete by placing auxiliary controls on the back of the cement truck. However, a person operating the auxiliary controls must walk alongside the truck during operation. U.S. Pat. No. 5,492,402 discloses a self propelled trailer with a control station for dispensing concrete. The trailer requires a separate vehicle to haul the trailer to and from a job site. U.S. Pat. No. 5,884,998 discloses a front discharge concrete mixer with a remote control unit to control the dispensing of concrete. The remote unit does not control vehicle movement, and thus a person in the driver's seat is still essential for positioning the vehicle.

T.L. Smith Company produced a rear dispensing concrete truck with an auxiliary control station, termed the RP-10, at least as early as 1992. The RP-10 requires a lengthening of the standard truck frame, drum and rear pedestal. The RP-10 uses a heavy and expensive hydrostatic transmission to move the truck backward and forward. The RP-10 controls a cylinder on the front axle to steer the truck. The cylinder, however, overpowers the steering system, which is not designed to be overpowered.

The present invention differs from the above referenced inventions and others similar in that these prior devices do not provide a safe and economical rear discharge concrete mixer truck with a way for the driver to re-position the truck and position the chute as desired. In addition, the other concrete mixer trucks do not provide the advantages of using a standard over-the-road truck modified for concrete mixing wherein the mixing assembly can be removed and the truck maximizes its value for other applications.

SUMMARY

The present invention provides a rear discharge concrete mixer truck with an auxiliary control station that includes a rear-facing seat from which all the major functions of the truck including forward, reverse, steering, park and service brakes, lateral and vertical chute positions, and engine speed can be effected. During transit from the ready mix yard to the job-site, the driver operates the truck from the truck cab like a normal truck. Upon arrival at the site, he moves to the auxiliary control station where he finishes positioning the truck to pour concrete.

The unload chute and the truck's position can be controlled via hand and foot controls such that the driver can exclusively use the auxiliary control station from start to finish. In the preferred embodiment, joysticks are used to control movement of the truck and positioning of the chute while a foot throttle and a treadle valve are used to control the engine speed and the service brakes, respectively.

Safety features have been incorporated into the assembly. A parking brake is provided through a dual position hand valve such that it can be set in the truck cab and released at the station or vice versa. In addition, the rear-facing seat is spring-loaded and associated with a proximity power switch wherein the switch is closed only when enough weight is in the seat to push it down far enough. The proximity switch, in turn, provides power for steering and moving the truck and, therefore, the truck cannot be moved unless someone is sitting in the rear-facing seat or in the truck cab. A parking brake, service brakes, drum function, and engine speed are functional via parallel wiring and power from the truck battery and are not accessed via the aforementioned proximity power switch. For convenience, the chute's swing function can also be operated without the requirement of weight in the rear-facing seat.

One of the advantages of the present invention is the efficiency that it provides by eliminating the need for a second laborer by providing access to movement of the truck from a rear-facing seat.

Another advantage of the present invention is the series of safety features incorporated which make movement of the truck controlled only by a person in the cab of the truck, or one on the rear-facing auxiliary seat, and not both and the parallel wiring connections for other controls that allow control from either position as needed.

An additional advantage of the present invention is the provision of controls from the rear-facing auxiliary seat for both the vertical and lateral positioning of the chute.

An advantage of the present invention is also that it comprises a relatively simple improvement easily retrofitted on existing rear discharge concrete mixing trucks.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

It is one object of the present invention to provide an assembly wherein the driver of the concrete mixer truck can re-position the truck and position the chute to unload concrete as needed from one location.

It is a second objective of the present invention to provide an assembly with which a standard rear discharge concrete mixer truck may be easily retrofitted.

It is a third objective of the present invention to provide an assembly which may be included as part of a new mixer truck without requiring a purpose-built chassis.

It is a fourth objective of the present invention to meet the above objectives while including adequate safety measures.

DESCRIPTION OF THE PREFERRED EMBODIMENT(S)

Figure 1:
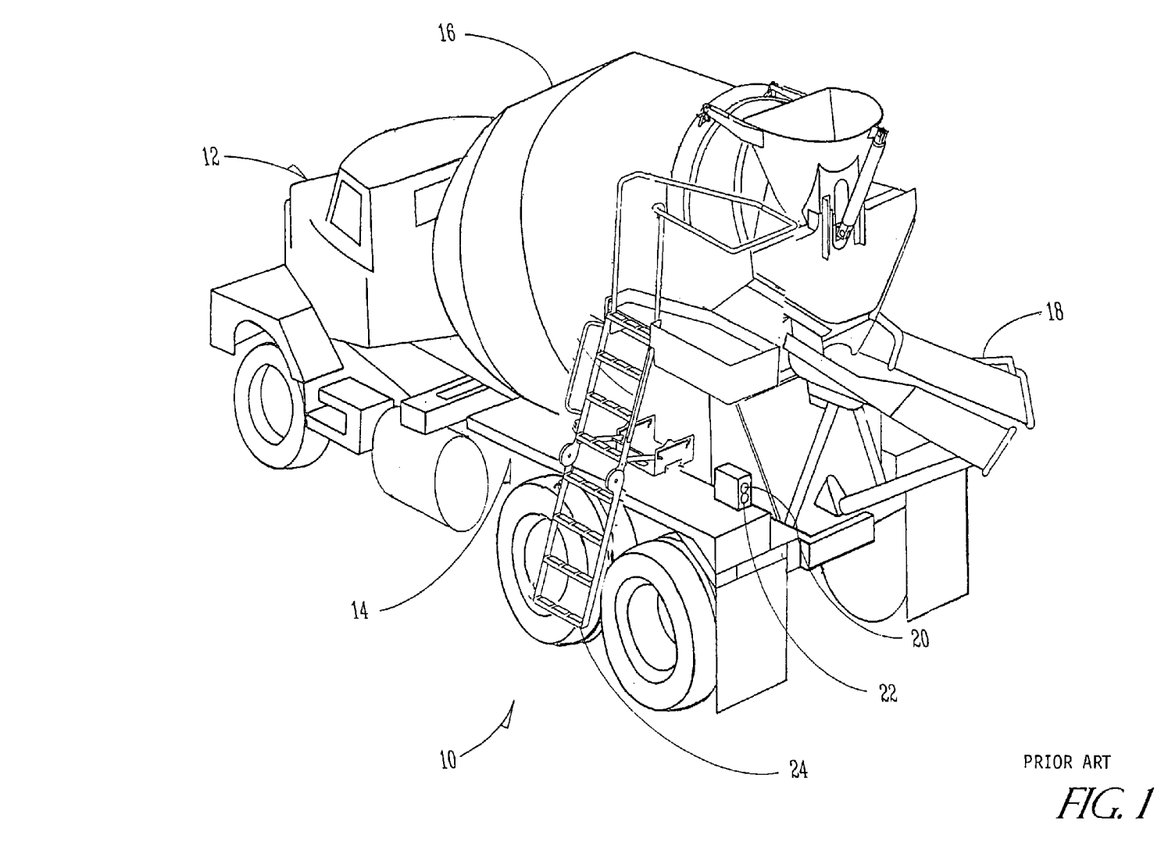
FIG. 1 is a perspective view of a rear dispensing concrete mixing vehicle.

For purposes of example only, FIG. 1 shows a representation of a rear dispensing concrete mixing vehicle 10 as is currently known in the art. The vehicle 10 has a front cab 12 facing forward, a chassis 14, a drum 16 for holding, mixing, and dispensing concrete, and a rear mounted concrete dispensing chute 18. For illustrative convenience, a main drum control system 20 and a main hydraulic control system 22 are shown mounted on the chassis 14 and facing rearward. The vehicle 10 may include a ladder 24 for the purpose of accessing the drum 16. Not seen in FIG. 1 but well known in the art are a transmission control system, a transmission with standard gears, a braking system, a parking brake, a steering column, and a primary throttle, all located in the front cab and employed for controlling motion of the vehicle 10 to serve as a primary vehicle control system.

Figure 2:
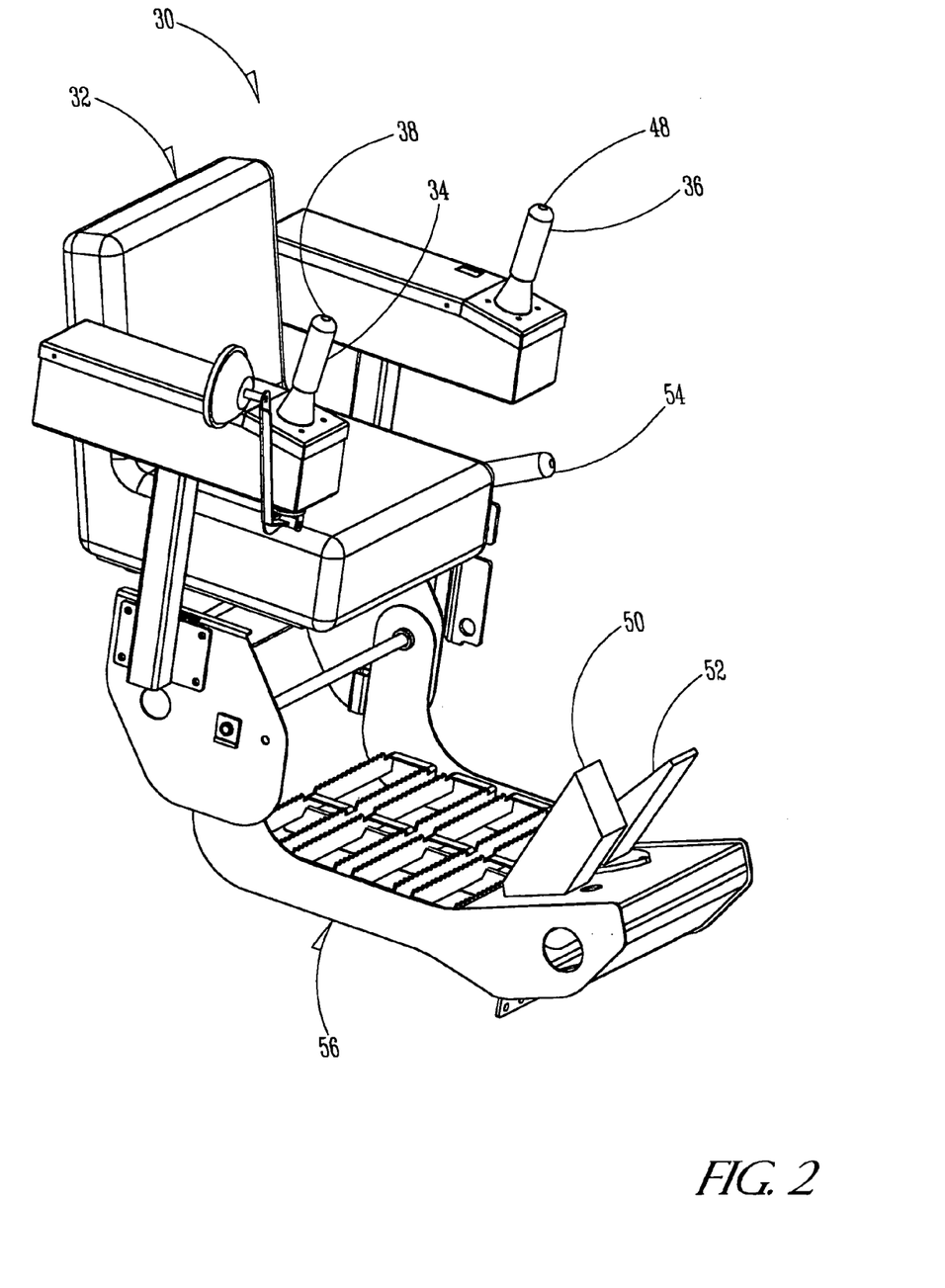
FIG. 2 is a perspective view of a preferred embodiment of the present invention of an auxiliary control station.

A preferred embodiment of an auxiliary control station 30 is shown in FIG. 2. For comfort and safety, the station 30 is built around an auxiliary control seat 32. Within reaching distance from the seat 32 are means to control steering, means to control braking, means to control transmission, means to control throttle, and means to control dispensing of concrete. The placement of such control means is not critical to the present invention as they may be placed anywhere accessible from the seat 32.

The placement of the above control means in the preferred embodiment is shown in FIG. 2. A chute control joystick 34 is located to the right of the seat 32 and serves as means to control dispensing of concrete. To raise and lower the chute 18, the joystick 34 is moved forward and backward, respectively. The same chute control joystick 34 controls left and right swing of the chute 18 by movement of the joystick 34 left and right, respectively.

Located to the left of the seat 32 is a drum control joystick 36 that further acts as means to control dispensing of concrete to turn the drum 16 into position to discharge concrete by movement of the drum control joystick 36 forward. Movement of the drum control joystick 36 backward turns the drum 16 in position to charge. The speed of the drum 16 is controlled by the degree of movement of the drum control joystick 36. In the preferred embodiment, the drum control joystick 36 is wired in parallel with the main drum control system 20.

Figure 3:
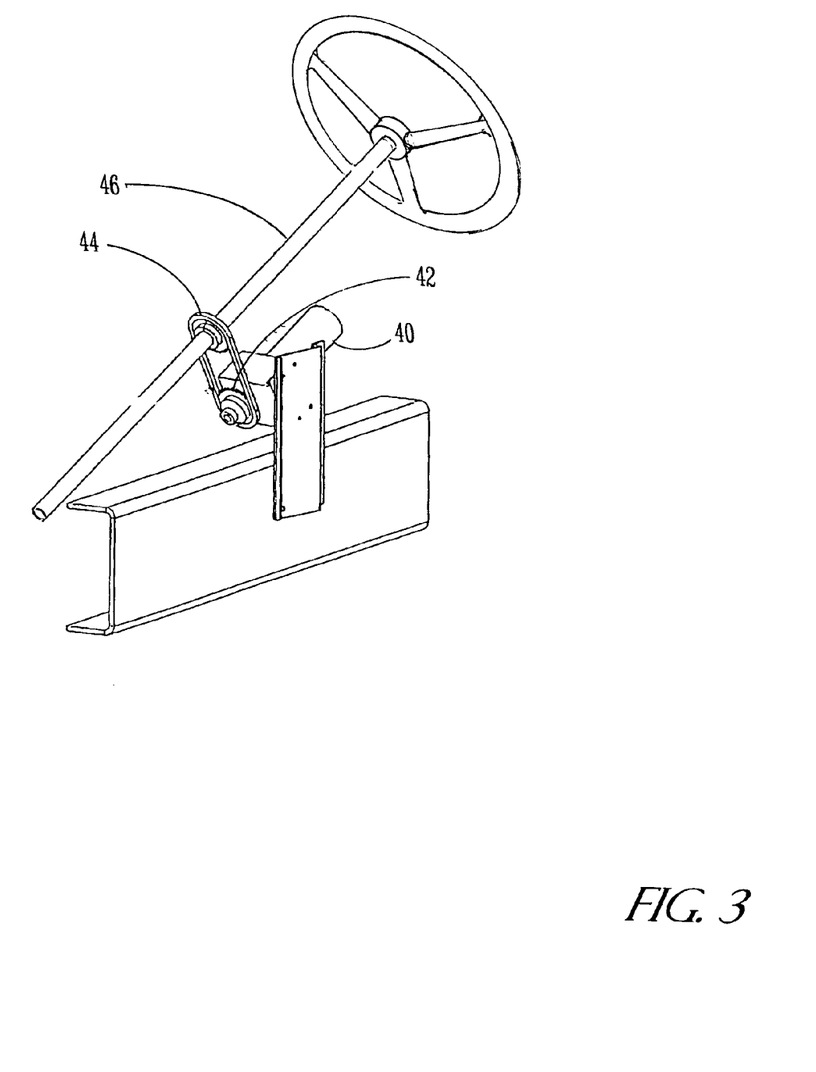
FIG. 3 is a perspective view of a steering column, a friction clutch, a roller chain sprocket, and a gear motor of the preferred embodiment of the present invention.

Left and right movement of a steering switch 38 that serves as means to control steering accomplishes steering of the vehicle 10 from the preferred embodiment of the auxiliary control station 30. The steering switch 38 is located at the end of the chute control joystick 34 in the preferred embodiment. The steering switch 38 is wired to a gear motor 40, which is shown in FIG. 3. A friction clutch 42 is attached to the gear motor 40 and a roller chain sprocket 44 is attached to the friction clutch 42 and a steering column 46. The steering switch 38 sends current to operate the gear motor 40, which in turn rotates the roller chain sprocket 44 and thereby cause rotation of the steering column 46. The friction clutch 42 adds another redundant failsafe. The torque of the friction clutch 42 is low enough that it can be overpowered by rotating the steering column 46 in the unlikely event the auxiliary control station 30 malfunctions.

Referring back to FIG. 2, a momentary rocker switch 48 located on the end of the drum control joystick 36 acts as means to control transmission. Movement of the momentary rocker switch 48 forward shifts the transmission into a forward gear and movement of the momentary rocker switch 48 backward shifts the transmission into a reverse gear. Without pressure on the momentary rocker switch 48, the transmission remains neutral.

Motion of the vehicle 10 as controlled by the preferred embodiment of the auxiliary control station 30 is accomplished by movement of a foot pedal 50, that serves as means to control throttle and is wired in parallel with the primary throttle located in the front cab 12. The primary throttle is well known in the art and is not displayed. (Subsequently, after movement of the momentary rocker switch 48 to effect a shift to a forward or reverse gear, an operator next pushes the foot pedal 50 to actually move the vehicle 10.)

Movement of a foot pedal treadle valve 52 teed into the primary braking system of the vehicle 10 accomplishes braking of the vehicle 10 from the preferred embodiment of the auxiliary control station 30. Braking is further accomplished by a hand controlled valve 54 plumbed in parallel with the parking brake of the vehicle 10. (The hand valve 54 is connected to the parking brake by a dual position style valve. The dual position style valve allows activation of the parking brake from the front cab 12 and the auxiliary control station 30. The dual position style valve and the connection are well known in the art and not shown). Thus, the foot pedal treadle valve 52 and the hand valve 54 serve together to form a means to control braking. For illustrative purposes, the hand valve 54 is shown attached to the right of and above the seat 32, but the hand valve 54 may be attached anywhere within reach from the seat. The seat 32 of the preferred embodiment includes an optional folding footrest 56. When folded, the footrest 56 does not protrude from the vehicle 10 to create a hazard during transport. In the preferred embodiment, one or more vehicle controls are housed on the folding footrest 56, as seen in FIG. 3, but no controls need be housed on the folding footrest 56.

Figure 4:
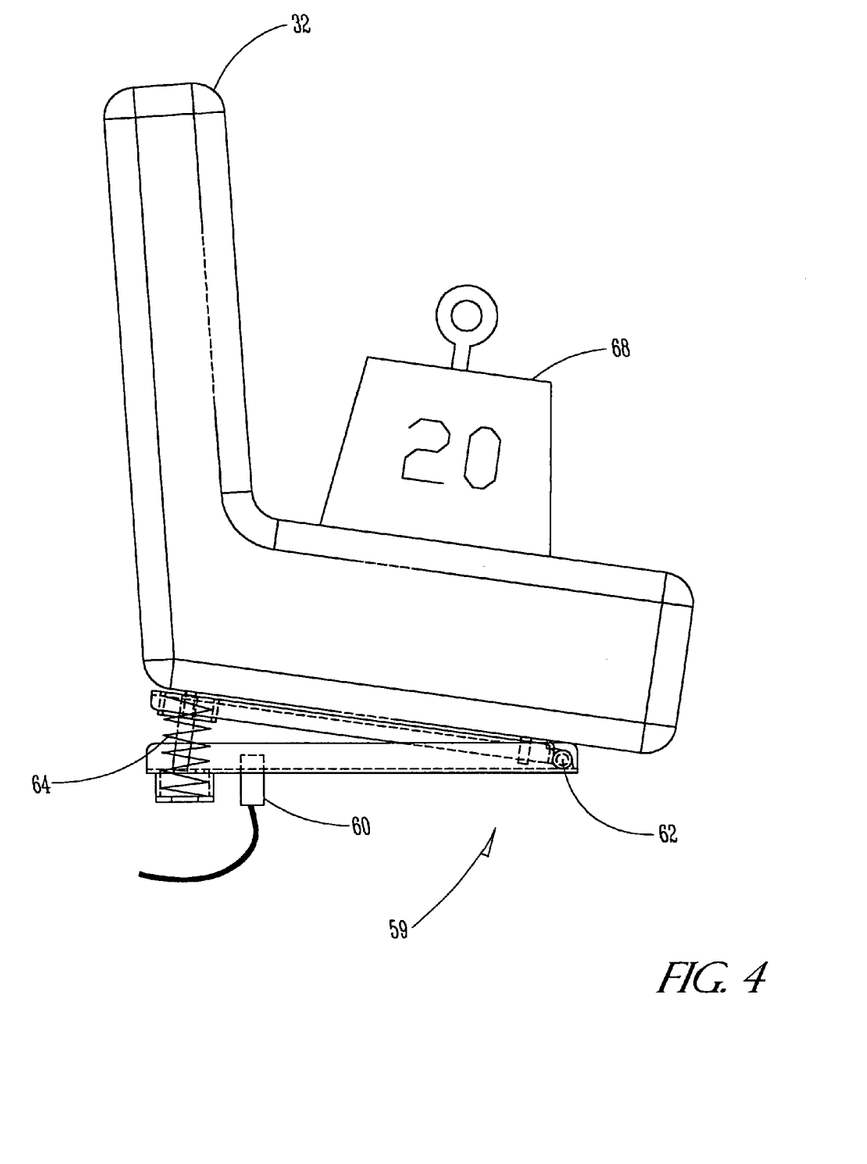
FIG. 4 is a side view in elevation of an auxiliary control station seat.

With reference now to FIG. 4, the preferred embodiment of the auxiliary control seat 32 contains a switch assembly

59. A pivot 62 is located on a side of the seat 32, such as the front side. Located under the seat 32 are a spring 64 and a seat proximity switch 60. The spring 64 prevents the proximity switch 60 from making contact with the seat 32. Placement of weight upon the seat 32 overrides the spring 64 and allows the proximity switch 60 to make contact. A weight of 20 lbs 68 will override the spring 64 in the preferred embodiment. The proximity switch 60 provides an extra level of security for the vehicle 10 so that no commands can come from the auxiliary control station 30 without an operator sitting in the seat 32. The proximity switch 60 also forces an operator to be seated when moving the vehicle 10, giving protection to the operator from run over or other hazards. In the preferred embodiment, the switch 60 powers the drum control joystick 36, the steering switch 38, the momentary rocker switch 48, and the foot pedal 50.

Figure 5:
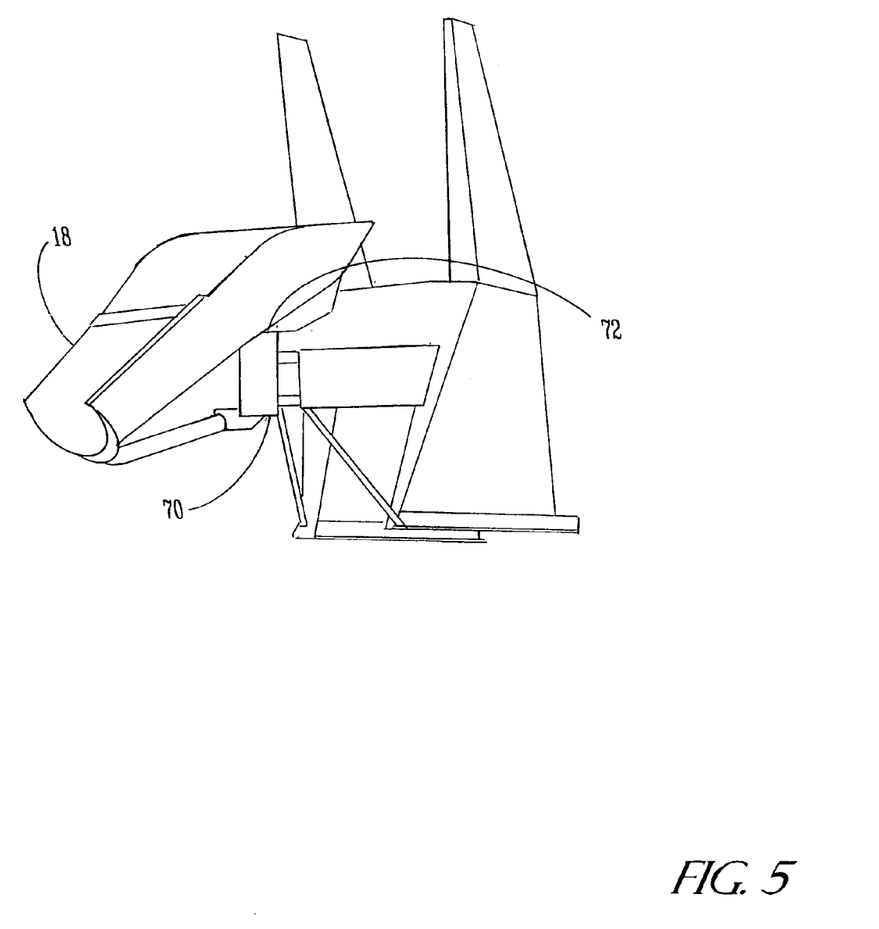
FIG. 5 is a side view in elevation of a modified rear mounted concrete dispensing chute.
Figure 6:
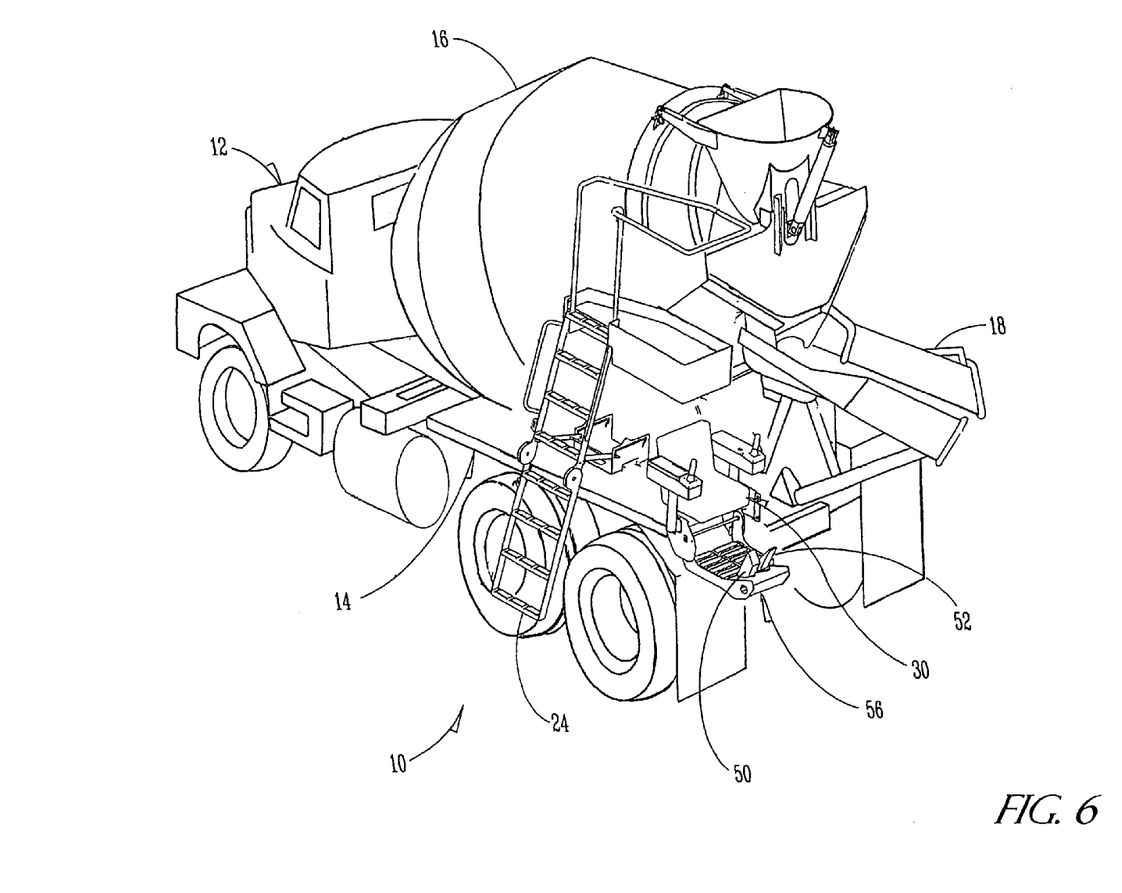
FIG. 6 is a rear dispensing concrete mixing vehicle with an auxiliary control station of the present invention.

To swing the chute 18 left and right, the rear mounted concrete dispensing chute 18 must be modified as seen in FIG. 5 and FIG. 6. A hydraulic rotary actuator 70 is attached to the chassis 14 in the same location as where the prior art chute 18 would be attached to the chassis 14. See FIG. 1. A chute pivot mount assembly 72 is connects the actuator 70 to the chute 18 such that rotation of the actuator 70 rotates the chute 18. Consequently, the actuator 70 and chute pivot mount assembly 72 act, as further means to control the dispensing of concrete and can be mounted on the chassis 14 with minimal welding and drilling.

In the preferred embodiment, the auxiliary control station 30 is mounted behind the chassis 14 facing rearward, to the right of the chute 18, as seen in FIG. 6. However, the auxiliary control station 30 may be mounted anywhere on the chassis 14. The auxiliary control station 30 may be added and removed from a vehicle 10 in existence or a vehicle 10 that is newly constructed. If the vehicle 10 includes a ladder 24, the ladder 24 may be repositioned to accommodate positioning of the seat 32 as seen in FIG. 6.

Figure 7:
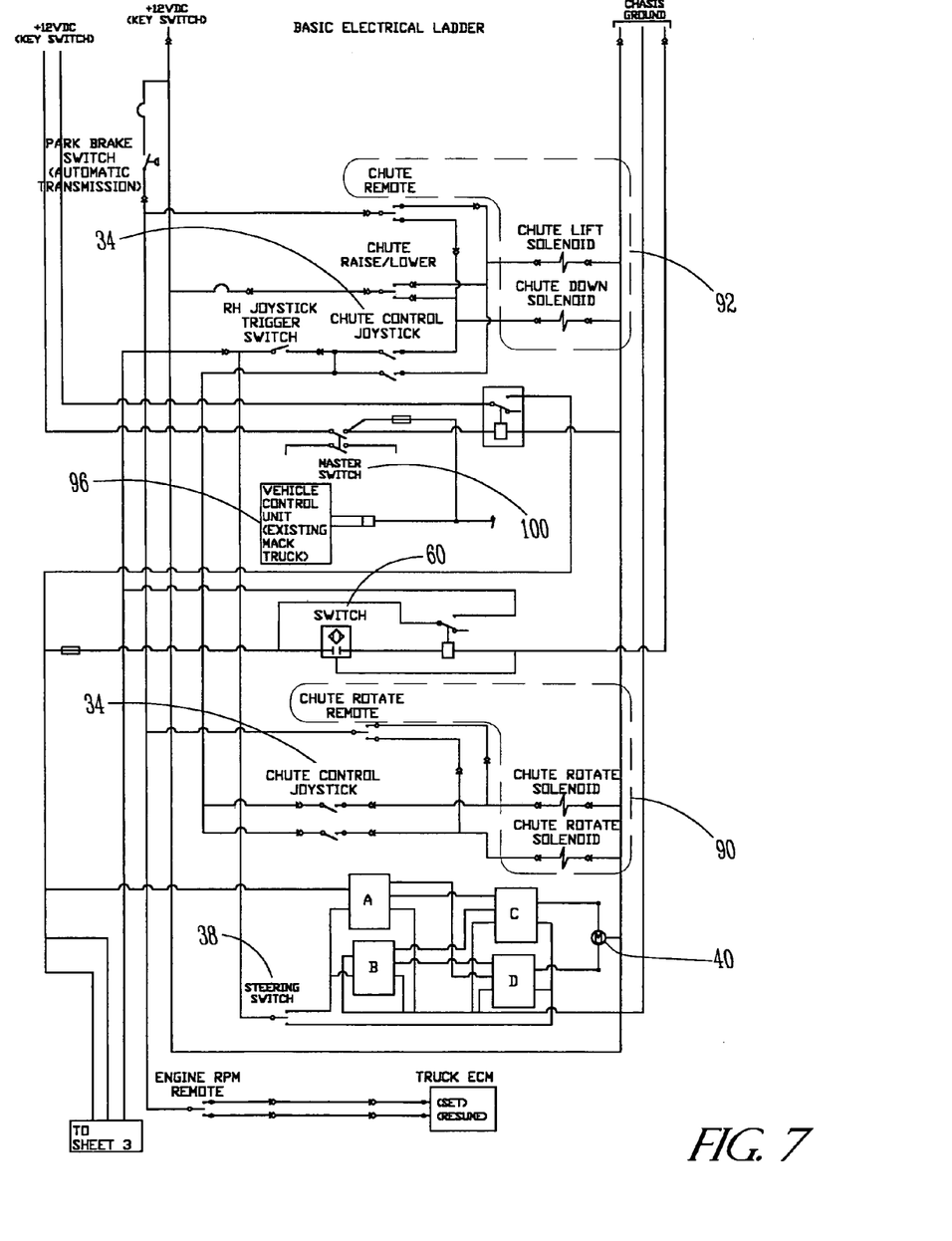
FIG. 7 is an electrical schematic of a portion of the present invention.

As illustrated in a schematic of the preferred embodiment in FIG. 7, the steering switch 38 is wired directly to the gear motor 40. The chute control joystick 34 is wired to the hydraulic rotary actuator 70 (not shown in FIG. 7) via an electric to pneumatic connection 90 between the chute control joystick 34 and the hydraulic rotary actuator 70. The chute control joystick 34 in the preferred embodiment also controls raising and lowering the chute 18 by a similar hydraulic control system connection 92 between the chute control joystick 34 and the main hydraulic control system 22.

Figure 8:
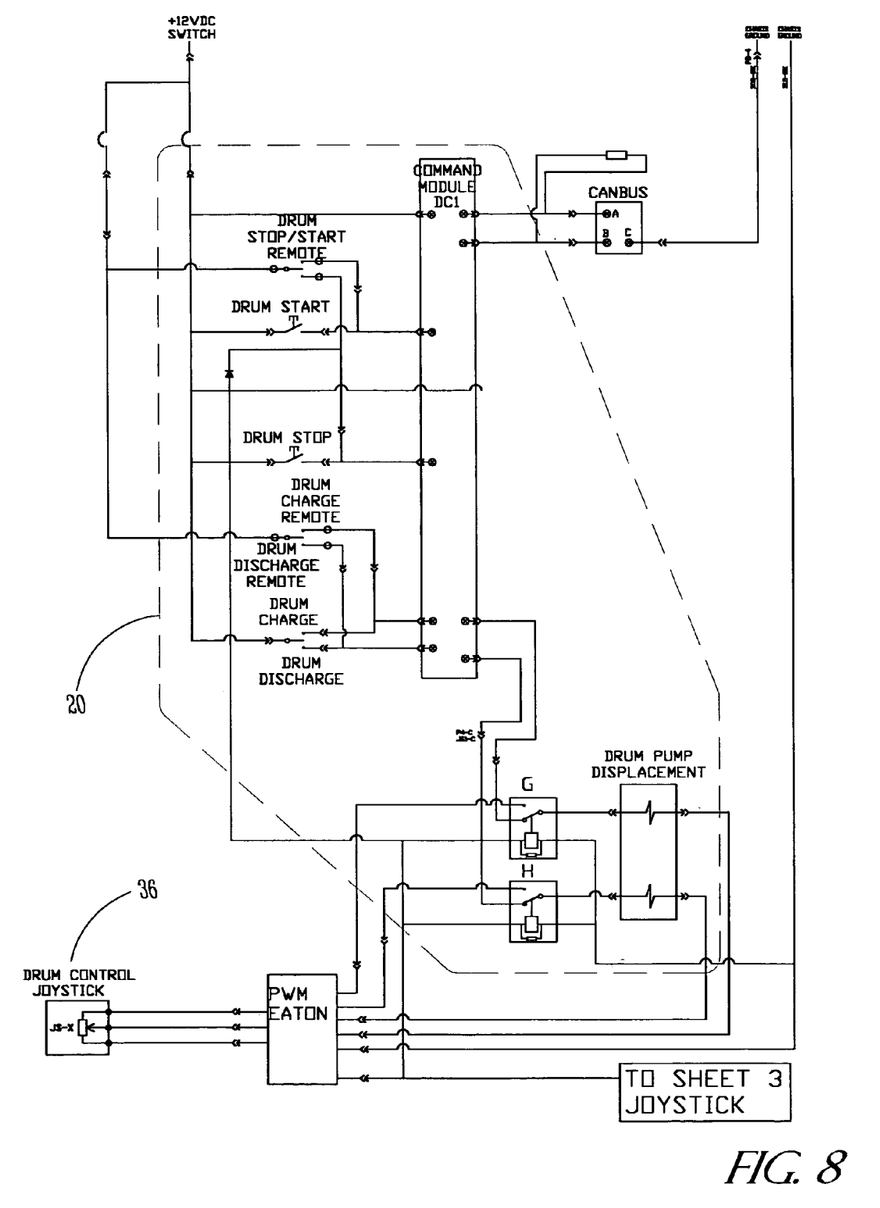
FIG. 8 is an electrical schematic of a portion of the present invention.

As displayed in a schematic of the preferred embodiment in FIG. 8, the drum control joystick 36 is wired in parallel with the main drum control system 20. The main drum control system 20 further controls the drum 16 as is known in the art. As seen in the schematic of the preferred embodiment in FIG. 9, the foot pedal 50 is wired in parallel with a primary throttle 94 and both are wired to a primary vehicle control system 96. The primary vehicle control system 96 controls motion of the vehicle 10 as is known in the art. In the preferred embodiment, the momentary rocker switch 48 is wired directly to the transmission control system 98. The transmission control system 98 as seen in FIG. 9 is a simplified drawing of the transmission control system 98 that is well known in the art.

Figure 9:
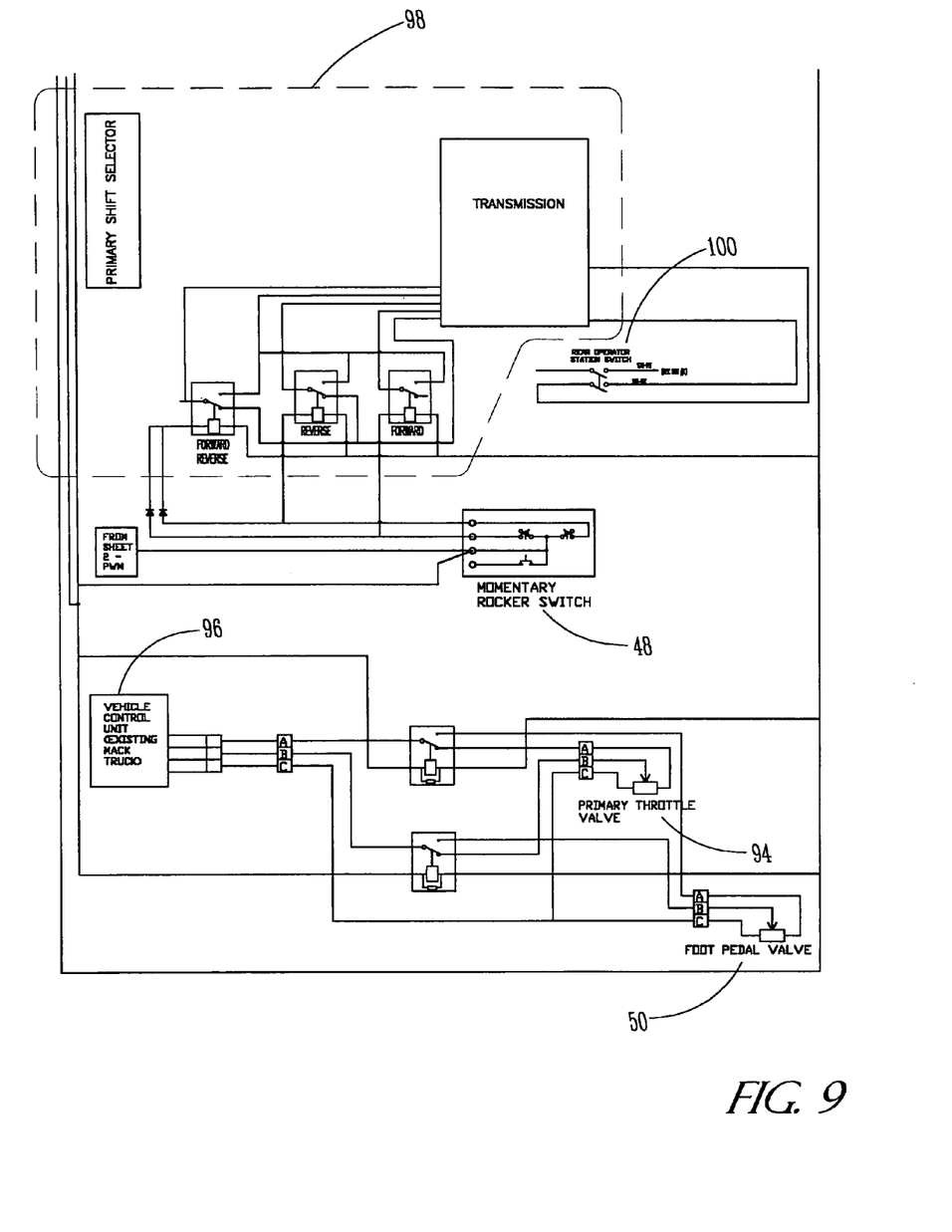
FIG. 9 is an electrical schematic of a portion of the present invention.

A master switch 100 is wired to auxiliary controls as seen in FIG. 9. The master switch 100 is accessible from the front cab 12 (not shown) and provides a further level of control over the control station 30. In the preferred embodiment, the master switch 100 supplies power to the control station 30 such that no commands can come from the auxiliary control station while the master switch 100 is switched off.

Thus, the present invention has been described in an illustrative manner. It is to be understood that the terminology that has been used is intended to be in the nature of words of description rather than of limitation.

Many modifications and variations of the present invention are possible in light of the above teachings. For example, auxiliary controls such as the steering switch 38 and the momentary rocker switch 48 may be located on either joystick, the seat 32 itself, or the chassis 14. Therefore, within the scope of the appended claims, the present invention may be practiced otherwise than as specifically described.

What is claimed is:

1. An auxiliary control station for a rear dispensing concrete mixing vehicle with a front cab, a chassis, a rear mounted concrete dispensing chute, mechanics for raising and lowering said chute, a transmission with standard gears, a transmission control system, a steering column, a braking system, a parking brake, a Primary throttle, a Primary vehicle control system, a drum, and a main drum control system, a main hydraulic control system, wherein said auxiliary control station comprises:
 (a) an auxiliary control station seat associated with said chassis of said vehicle;
 (b) auxiliary controls including:
  (i) means to control steering of said vehicle;
  (ii) means to control braking of said vehicle;
  (iii) means to control said transmission of said vehicle;
  (iv) means to control said throttle of said vehicle;
  (v) means to control dispensing of concrete by said vehicle;
 (c) said auxiliary controls accessible from said seat; and
 (d) said means to control steering comprises a steering switch which controls a gear motor for rotating a roller chain sprocket associated with said steering column for turning said steering column.

2. The control station of claim 1, wherein said means to control steering further includes a friction clutch connecting the gear motor to the roller chain sprocket.

3. The control station of claim 1, wherein said means to control braking comprises a foot pedal treadle valve teed into said braking system.

4. The control station of claim 3, wherein said means to control braking further includes a dual position style valve which activates said parking brake by action of a hand controlled valve accessible from said seat.

5. The control station of claim 1, wherein said transmission is an automatic transmission and said means to control transmission comprises a momentary rocker switch wired to said transmission control system.

6. The control station of claim 1, wherein said means to control throttle comprises a foot pedal wired to said primary vehicle control system in parallel with said primary throttle located in said front cab.

7. The control station of claim 1, wherein said means to control dispensing of concrete comprises a drum control joystick wired in parallel with said main drum control system for controlling the direction and speed of said drum.

8. The control station of claim 7, wherein said means to control dispensing of concrete further includes:
 (a) a chute control joystick;
 (b) a connection between the chute control joystick and the main hydraulic control system; and
 (c) movement of said chute control joystick results in raising or lowering said chute.

9. The control station of claim 8, wherein said means to control dispensing of concrete further includes:
   (a) a chute pivot mount assembly that allows the chute to swing left and right;
   (b) a hydraulic rotary actuator;
   (c) said chute control joystick;
   (d) a connection between said chute control joystick and said rotary actuator;
   (e) said hydraulic rotary actuator interacts with said chute pivot mount assembly such that movement of said rotary actuator swings said chute leftward and rightward; and
   (f) movement of said chute control joystick results in leftward and rightward swinging of said chute.

10. The control station of claim 1, wherein said seat includes a seat proximity switch which provides power for one or more auxiliary controls when weight is placed upon said seat and a switch assembly, said switch assembly comprising:
   (a) a pivot located on one side of said seat and allowing said seat to swing downward;
   (b) a spring located beneath said seat;
   (c) said spring loaded in a slight vertical position and preventing said seat that is pivoted from swinging downward unless said spring is sufficiently compressed; and
   (d) said seat proximity switch located beneath said seat and providing power upon contact with said seat.

11. The control station of claim 10, wherein said seat proximity switch makes contact when at least 20 lbs. is placed upon the seat.

12. The control station of claim 10, wherein said proximity switch provides power for said means to control steering, said means to control transmission, and said means to control throttle when at least 20 lbs. is placed upon the seat.

13. The control station of claim 1, wherein a master switch located in said front cab controls the power for said auxiliary controls.

14. The control station of claim 13, wherein said vehicle includes a ladder attached to said chassis to provide access to said drum and said seat is positioned facing rearward such that said ladder is positioned to accommodate said seat.

15. The control station of claim 1, wherein said seat further includes a folding footrest and said footrest incorporates at least one of said auxiliary controls.

16. An auxiliary control station for a rear dispensing concrete mixing vehicle with a front cab, a chassis, a rear mounted concrete dispensing chute, mechanics for raising and lowering said chute, a transmission with standard gears, a transmission control system, a steering column, a braking system, a parking brake, a primary throttle, a primary vehicle control system, a drum, a main drum control system, and a main hydraulic control system, wherein said auxiliary control station comprises:
   (a) an auxiliary control station seat attached to said chassis of said vehicle;
   (b) a steering switch which controls a gear motor for rotating a roller chain sprocket associated with said steering column thereby turning said steering column and a friction clutch connecting the gear motor to the roller chain sprocket;
   (c) a foot pedal treadle valve and at least one air supply hose teed into said braking system and a dual position style switch which activates said parking break by action of a hand controlled valve accessible from said seat;
   (d) a momentary rocker switch wired to said transmission control system;
   (e) a foot pedal wired to said primary vehicle control system in parallel with said primary throttle located in said front cab;
   (f) a drum control joystick wired in parallel with said main drum control system to control the direction and speed of said drum;
   (g) a chute control joystick wired in parallel to the main hydraulic control system to control the raising and lowering of said chute;
   (h) said auxiliary controls are accessible from said seat; and
   (i) a seat proximity switch which provides power for one or more auxiliary controls when at least 20 lbs. is placed on said seat and a switch assembly, said switch assembly comprising:
      (i) a pivot located on one side of said seat and allowing said seat to swing downward;
      (ii) a spring located beneath said seat;
      (iii) said spring loaded in a slight vertical position and preventing said seat that is pivoted from swinging downward unless said spring is sufficiently compressed; and
      (iv) said seat proximity switch located beneath said seat and providing power upon contact with said seat.

17. The control station of claim 16 wherein said control station further includes:
   (a) a chute pivot mount assembly that allows the chute to swing left and right;
   (b) a hydraulic rotary actuator;
   (d) a joystick;
   (e) a connection between said joystick and said rotary actuator such that said rotary actuator swings said chute when said joystick is moved.

18. The control station of claim 16, wherein said vehicle includes a ladder attached to said chassis to provide access to said drum and said seat is positioned facing rearward such that said ladder is positioned to accommodate said seat.

19. The control station of claim 16, wherein said seat further includes a folding footrest and said footrest incorporates said at least one of said auxiliary controls.

* * * * *